(12) United States Patent
Yoshida et al.

(10) Patent No.: US 7,004,860 B2
(45) Date of Patent: Feb. 28, 2006

(54) BELT TYPE INFINITE VARIABLE-SPEED DRIVE

(75) Inventors: Isamu Yoshida, Shizuoka (JP);
Kiyotake Shibata, Shizuoka (JP);
Masahiro Nobutomo, Shizuoka (JP);
Morihisa Yoshioka, Shizuoka (JP)

(73) Assignee: NTN Corporation, Osaka (JP)

( * ) Notice: Subject to any disclaimer, the term of this patent is extended or adjusted under 35 U.S.C. 154(b) by 245 days.

(21) Appl. No.: 10/156,940

(22) Filed: May 30, 2002

(65) Prior Publication Data
US 2002/0183146 A1 Dec. 5, 2002

(30) Foreign Application Priority Data
May 31, 2001 (JP) .............................. 2001-163933

(51) Int. Cl.
*F16H 9/04* (2006.01)
(52) U.S. Cl. ............................. 474/20; 474/17; 474/23
(58) Field of Classification Search .................... 474/8, 474/12, 17, 18, 28, 39, 69, 70, 20, 23
See application file for complete search history.

(56) References Cited
U.S. PATENT DOCUMENTS
4,504,247 A * 3/1985 Chana et al. .................. 474/17
4,735,598 A * 4/1988 Moroto et al. ................. 474/29
4,909,776 A * 3/1990 Sakakibara et al. ........... 474/25
4,973,288 A * 11/1990 Sakakibara et al. ........... 474/28
5,057,061 A * 10/1991 Sakakibara et al. ......... 475/210
5,080,639 A * 1/1992 Sakakibara et al. ......... 475/211
5,094,652 A * 3/1992 Sakakibara et al. ............ 474/8
5,173,084 A * 12/1992 Lemieux ........................ 474/8
5,295,407 A * 3/1994 Hirose et al. ............... 74/89.37

FOREIGN PATENT DOCUMENTS
JP          8-33170          3/1996

* cited by examiner

*Primary Examiner*—David A. Bucci
*Assistant Examiner*—Bradley J. Van Pelt
(74) *Attorney, Agent, or Firm*—Wenderoth, Lind & Ponack, L.L.P.

(57) ABSTRACT

A belt type infinite variable-speed drive using a ball-screw mechanism is compact and noise-free. A nut of the ball-screw mechanism is fixed to a casing and a threaded shaft is rotatably coupled to a movable pulley member through a ball bearing so that ball circulating portions on the nut will not rotate while the movable pulley member is movable axially. Also, the ball circulating portions, which are low in load bearing capacity, are oriented in such a direction that a load hardly acts on the ball-screw mechanism. This makes it possible to compactly and rationally design a belt type infinite variable-speed drive and to suppress noise due to vibration of balls in the ball circulating portions.

3 Claims, 5 Drawing Sheets

BELT TYPE INFINITE VARIABLE-SPEED DRIVE

BACKGROUND OF THE INVENTION

This invention relates to a belt type infinite variable-speed drive having a movable pulley portion that is moved axially by a ball-screw mechanism.

A belt type infinite variable-speed drive has a fixed pulley portion and a movable pulley portion around which is wound a transmission belt. These pulley portions are mounted on a rotary shaft with their belt-receiving surfaces opposing each other. By axially moving the movable pulley portion by virtue of a direct acting actuator, a winding diameter of the transmission belt is changed in a stepless manner. As direct acting actuators, there are hydraulic actuators and mechanical actuators such as ball-screw mechanisms.

In a ball-screw mechanism, a nut having helical thread grooves formed in its inner periphery is mounted on a threaded shaft having helical thread grooves formed in its outer periphery. Between opposed thread grooves of the threaded shaft and the nut, a plurality of balls are rollably received so that the threaded shaft and the nut can smoothly move axially relative to each other. The nut has ball circulating portions for infinitely circulating the balls between the opposed thread grooves. Many of such ball-screw mechanisms are of a type in which, by axially moving the nut with axial movement of the threaded shaft prevented so as to move the nut relative to the threaded shaft, a moving member coupled to the nut is linearly moved.

Since belt type infinite variable-speed drives using a ball-screw mechanism as a direct acting actuator allows for a more compact design than that possible when using a hydraulic actuator, such variable-speed drives are used as infinite variable-speed drives for automobiles in which mounting space is limited, particularly small cars.

A prior art belt type infinite variable-speed drive is described in JP patent publication 8-33170. In this belt type infinite variable-speed drive, by turning a nut with a threaded shaft of a ball-screw mechanism rotatably and axially movably supported to a support member provided integrally with a casing, a movable pulley portion as a movable member coupled to the nut is linearly moved in an axial direction.

Since a belt type infinite variable-speed drive using the above-described conventional ball-screw mechanism is of a type in which the nut is turned, circumferential positions of ball circulating portions provided on the nut change with rotation of the nut. Since there is a clearance between the ball circulating portions and balls to smoothly circulate the balls, the balls in the ball circulating portions cannot bear loads such as moment loads and radial loads that act on the ball-screw mechanism. Also, directions of loads that act on the ball-screw mechanism of the belt type infinite variable-speed drive are substantially constant.

In a conventional belt type infinite variable-speed drive in which the nut turns, portions where ball circulating portions are provided, which are low in resistance to load, are periodically oriented in a load direction. Thus, it is necessary to additionally increase rigidity of the ball screw mechanism, so that no rational design is possible. Thus, further compactness of the belt type infinite variable-speed drive is impossible.

Also, since there is a clearance between the ball circulating portions and the nut, when the ball circulating portions turn together with the nut, balls vibrate and collide against walls of the ball circulating portions. This produces noise and wears the balls and the walls of the ball circulating portions.

An object of this invention is to provide a belt type infinite variable-speed drive of compact and rational design using a ball-screw mechanism, and to lessen noise.

SUMMARY OF THE INVENTION

According to this invention, there is provided a belt type infinite variable-speed drive comprising a pulley defined by a fixed pulley member and a movable pulley member, around which pulley is wound a transmission belt. The pulley members are mounted on a rotary shaft with their belt-receiving surfaces facing each other. The belt type infinite variable-speed drive further comprises a ball-screw mechanism for moving the movable pulley member axially to change a winding diameter of the transmission belt in a stepless manner. The ball-screw mechanism comprises a threaded shaft formed with a helical thread groove in an outer periphery thereof, and a nut formed with a helical thread groove in an inner periphery thereof and mounted on the threaded shaft. The threaded shaft is axially movable relative to the nut, and a plurality of balls are rollably received between opposed thread grooves of the threaded shaft and the nut. A ball circulating portion is provided in the nut for infinitely circulating balls between the thread grooves. The movable pulley member is moved axially by driving the threaded shaft with the nut arranged so as to not be rotatable and not be axially movable, and the threaded shaft is coupled to the movable pulley member so as to be rotatable and axially movable.

That is, by coupling the ball-screw mechanism to the movable pulley member with the nut being non-rotatable and not axially movable, and the threaded shaft being rotatable and axially movable, the ball circulating portions of the nut are prevented from turning when the movable pulley member is axially moved. The ball circulating portions, which are low in load bearing capacity, are oriented in such a direction that loads will not act on the ball-screw mechanism so as to make a compact and rational design possible, and to prevent noise due to vibration of the balls in the ball circulating portions.

By arranging the ball circulating portions within the outer diameter of the nut, it is possible to narrow space on an outer peripheral side of the nut and make compact a diametrical dimension of the belt type infinite variable-speed drive. As the ball circulating portions disposed within the outer diameter of the nut, an internal ball deflector type or a guide plate type can be used.

Even if the ball circulating portions are provided in a plurality of numbers, by arranging them in an area where a load acting on the ball-screw mechanism is smaller than a load acting on the ball-screw mechanism at any other area, it is possible to make design of the belt type infinite variable-speed drive compact and rational.

By forming the threaded shaft to be hollow, it is possible to couple its inner peripheral side to the movable pulley member through a bearing so as to be rotatable.

In an arrangement in which a coupling member comprising: a flange extending away from an outer periphery of a threaded shaft, and an overhang extending from the flange along an outer periphery of the threaded shaft to form an annular space for receiving the nut between the overhang and the outer periphery of the threaded shaft; and a gear, for transmitting a driving force to the threaded shaft, provided on an outer periphery of the overhang, it is possible to increase an effective length of the threaded shaft and shorten its overall length to shorten an axial dimension of the belt type infinite variable-speed drive.

By forming the gear integrally with the coupling member, it is possible to reduce a number of parts.

By making an overhanging length of the overhang larger than a maximum stroke of relative axial movement between the threaded shaft and the nut, it is possible to prevent scattering of lubricant for the ball-screw mechanism as the threaded shaft turns. If grease scatters outwardly, it may stick to the transmission belt, thereby lowering a frictional force between the belt and the pulley.

By providing a sealing device for sealing an annular space between an inner periphery of the overhang and an outer periphery of the nut, it is possible to more reliably prevent scattering of lubricant.

As the seal device, a radial gap between the inner periphery of the overhang and the outer periphery of the nut may be set at a small value, or an elastic member may be provided at the inner periphery of the overhang and the outer periphery of the nut, to seal the radial gap.

Other features and objects of the present invention will become apparent from the following description made with reference to the accompanying drawings, in which:

DETAILED DESCRIPTION OF THE PREFERRED EMBODIMENTS

Figure 1:
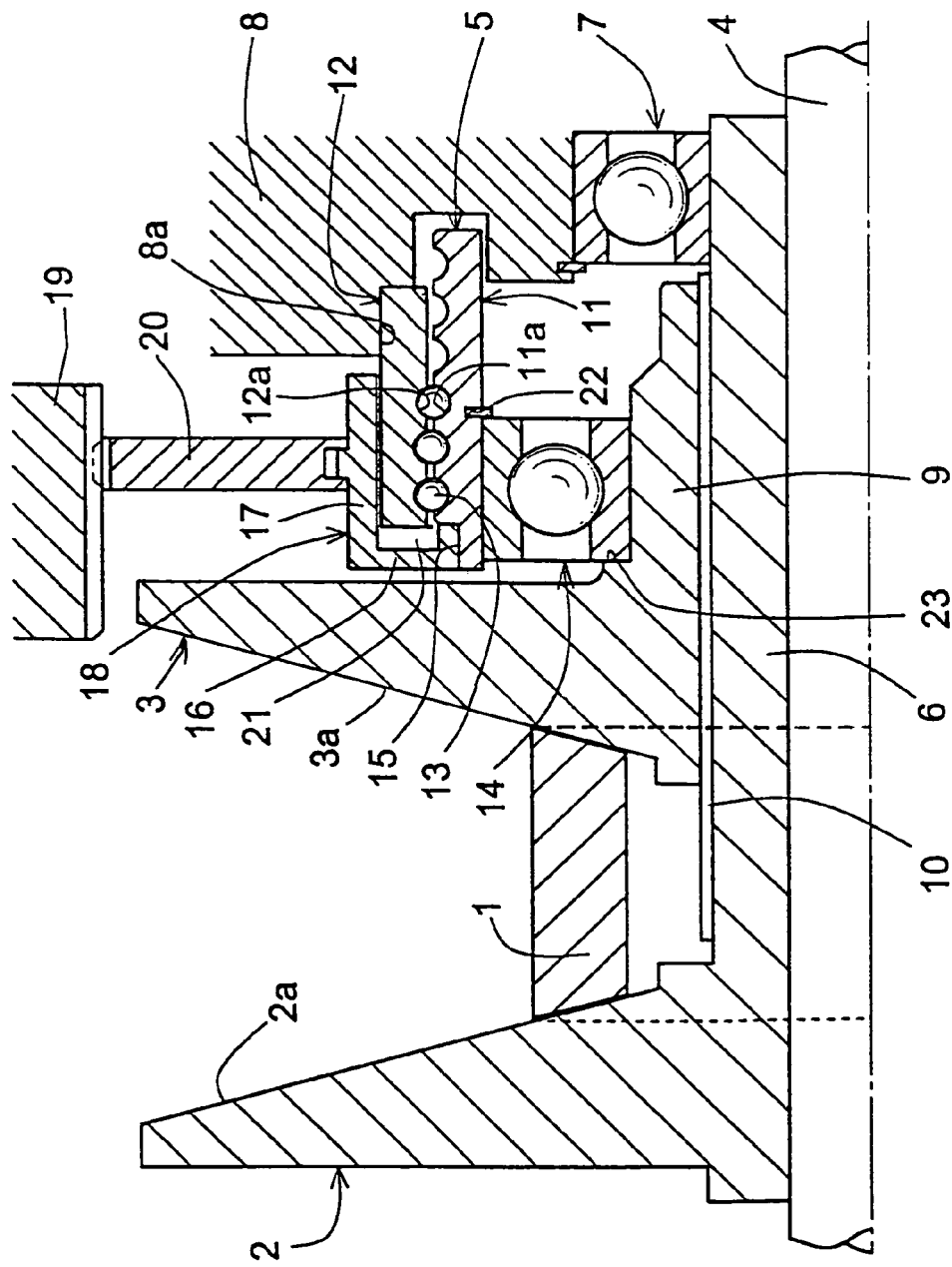
FIG. 1 is a longitudinal sectional view showing a belt type infinite variable-speed drive of a first embodiment.
Figure 2:
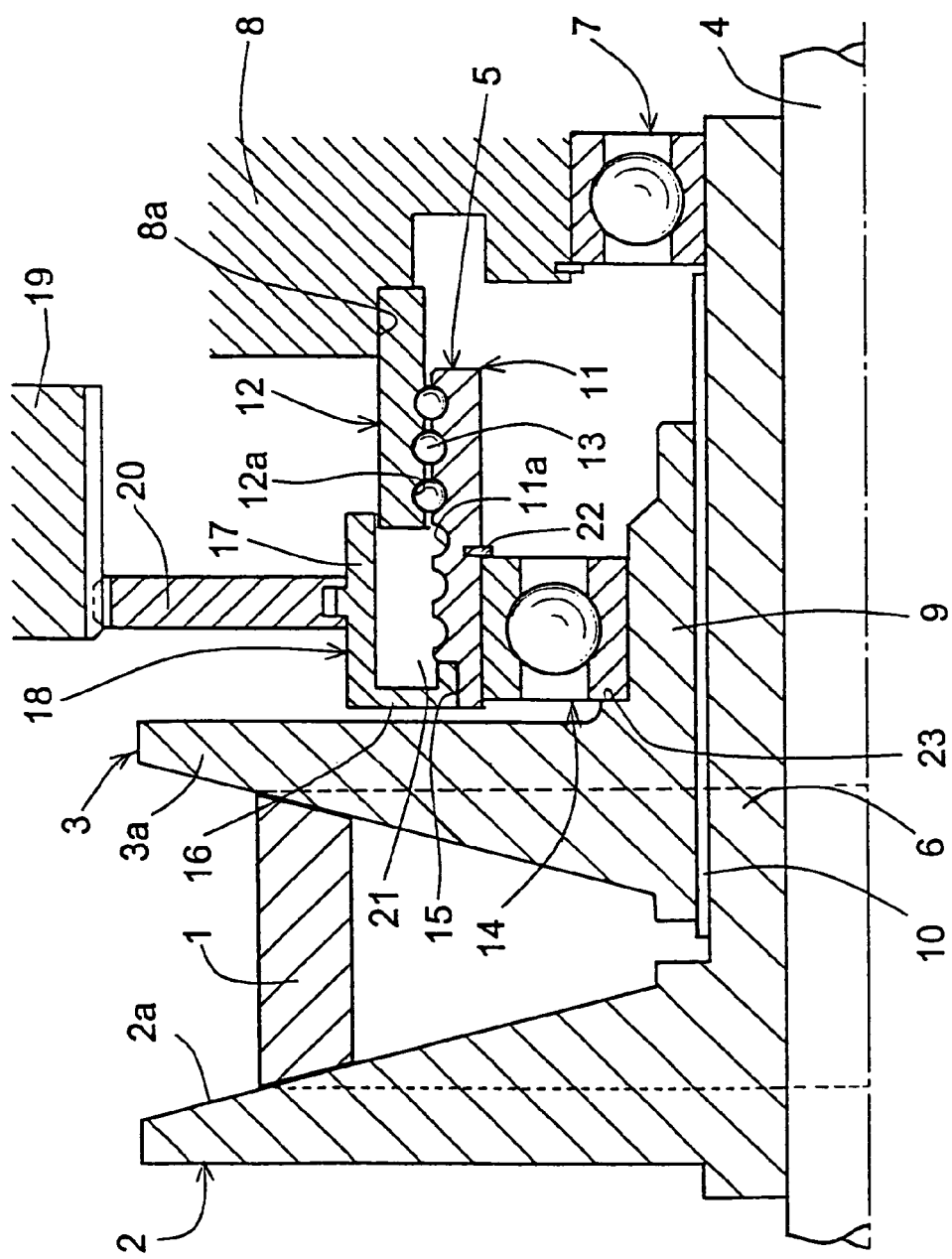
FIG. 2 is a similar view showing a movable pulley member which has moved.

Embodiments of this invention will be described with reference to FIGS. 1–5. FIGS. 1–3 show a first embodiment. As shown in FIG. 1, in this belt type infinite variable-speed drive, a pulley is defined by a fixed pulley member 2 and a movable pulley member 3, around which pulley is wound a transmission belt 1. The fixed pulley member 2 and the movable pulley member 3 are mounted on a rotary shaft 4 with their belt-receiving surfaces 2a, 3a facing each other. By axially moving the movable pulley member 3 by virtue of a ball-screw mechanism 5, a winding diameter of the transmission belt 1 is changed in a stepless manner.

The fixed pulley member 2 is provided with a tubular portion 6 extending toward the movable pulley member 3, and is coupled through a key to the rotary shaft 4 so as to rotate therewith. The rotary shaft 4 has its movable pulley member side supported on a casing 8 by a ball bearing 7 mounted on a tip of the tubular portion 6. Although not shown, the fixed pulley member 2, too, is supported on a casing by a bearing.

The movable pulley member 3 has a tubular portion 9 on a backside of the belt-receiving surface 3a, and is coupled to the tubular portion 6 of the fixed pulley member 2 through a slide key 10 so as to rotate with the movable pulley member 3 and be slidable in an axial direction of the movable pulley member.

The ball-screw mechanism 5 comprises a threaded shaft 11 formed with a helical thread groove 11a on its outer periphery, a nut 12 formed with a helical thread groove 12a in its inner periphery and mounted on the threaded shaft 11 so as to be movable in an axial direction relative to the threaded shaft 11, and a plurality of balls 13 rollably received between the thread grooves 11a and 12a. The threaded shaft 11 is in a shape of a hollow tube and has its inner periphery rotatably supported on the tubular portion 9 of the movable pulley member 3 by a ball bearing 14. The nut 12 is fitted in the inner periphery 8a of a recess of the casing 8 so that rotation and axial movement of the nut are impossible.

The threaded shaft 11 is provided with a small-diameter portion 15 at its end on a side of the movable pulley member 3. An annular coupling member 18, having a flange 16 and an overhang 17 extending from the flange 16 along an outer periphery of the shaft 11, is mounted on the small-diameter portion 15. In order to rigidly mount the coupling member 18, the small-diameter portion 15 is knurled.

On an outer periphery of the overhang 17, a gear 20 is mounted which slidably meshes with a gear 19 that is rotated by a motor (not shown). The threaded shaft 11 is rotated through the gear 20 and the coupling member 18. In order to smoothly slide the gear 20 relative to the gear 19, the gear 20 is formed of a resin that has a low friction coefficient.

The coupling member 18 is formed by performing a pressing operation which is a combination of drawing and burring of a steel plate. A height of the flange 16 is set slightly larger than that of nut 12 so that the nut can be housed in an annular space 21 formed between an outer periphery of the threaded shaft 11 and an inner periphery of the overhang 17.

By driving the gear 19 with a motor, the threaded shaft 11, which is rotatably supported by the ball bearing 14, moves in an axial direction relative to fixed nut 12 while rotating around the movable pulley member 3, thereby pushing and sliding the movable pulley member 3 toward the fixed pulley member 2. Thus, a distance between the belt receiving surface 3a of the movable pulley member 3 and opposed belt receiving surface 2a of the fixed pulley member 2 will narrow, so that a winding diameter of the transmission belt 1 increases.

Thus, in order to increase a winding diameter of the transmission belt 1, it is necessary to push up the transmission belt with the belt receiving surfaces 2a and 3a. Therefore, pushing force of the threaded shaft 11 must be large. Thus, end faces of an outer ring and inner ring of the ball bearing 14, on which pushing force of the threaded shaft 11 acts, are fixed by a snap ring 22 and a shoulder 23 of the tubular portion 9.

Conversely, when a winding diameter of the transmission belt 1 decreases, a pushing-down force from the transmission belt acts on the belt receiving surfaces 2a and 3a, so that it is possible to slide the movable pulley member 3 in an opposite direction, by virtue of the threaded shaft 11, with a small pulling force. Thus, it is not particularly necessary to fix the end faces of the inner and outer rings of the ball bearing 14 at their opposite ends to the snap ring 22 and the shoulder 23.

FIG. 2 shows a state in which a stroke of axial relative movement of the threaded shaft 11 and the nut 12 is maximum. At this time, a tip of the overhang 17 overlaps a tip of the nut 12. A radial gap between the inner periphery of the overhang 17 and the outer periphery of the nut 12 is set small enough to seal the annular space 21. Thus, grease as a lubricant for the ball-screw mechanism 5 will not splash out from the annular space 21.

Figure 3A:
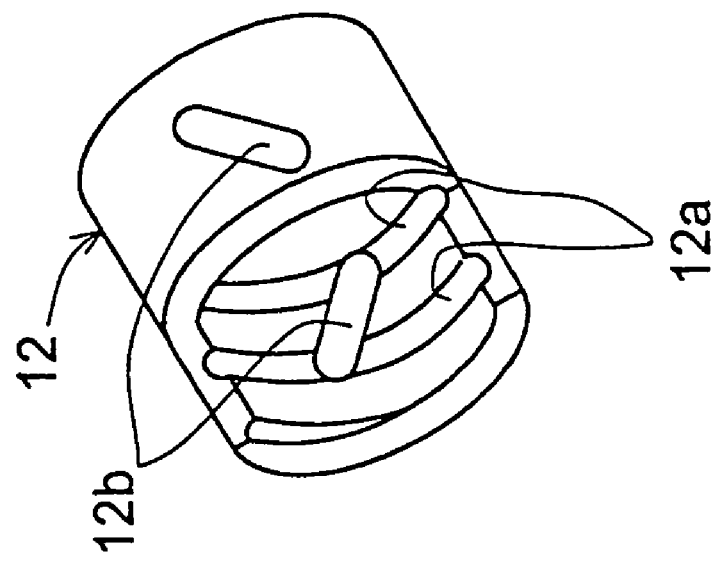
FIG. 3A is a cutaway perspective view of a nut of FIG. 1.

FIG. 3A shows an interior of the nut 12 by partially removing a portion thereof. As described above, the helical groove 12a is formed in an inner peripheral surface of the nut 12. In order to infinitely circulate the balls 13, ball circulating portions 12b, which couple together adjacent turns of grooves 12a, are provided. The ball circulating portions 12b are of an internal ball deflector type and circulate the balls 13 for every turn of the grooves 12a.

The nut 12 of FIG. 3a has two ball circulating portions 12b arranged opposite to each other and spaced apart from one another by 180°. This nut 12 is fitted into a recess of the casing 8 having an inner diameter 8a, with the ball circulating portions 12b directed in a horizontal direction, in which no load acts on the ball screw mechanism 5.

Figure 3B:
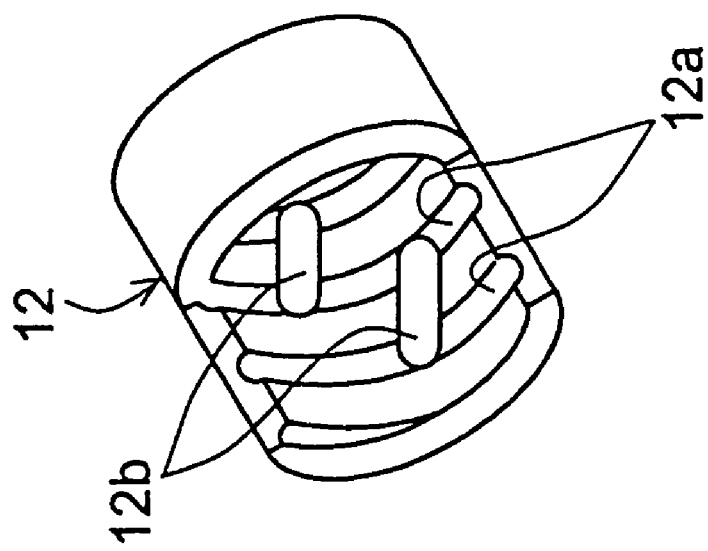
FIG. 3B is a similar view of a modified embodiment of the nut.

FIG. 3B shows a modified embodiment of the nut 12 in which two ball circulating portions 12b are arranged together in phase in a single direction.

Each ball circulating portion 12b is provided so as to be received within the nut 12. In order to smoothly circulate the balls 13, a clearance is provided between the balls 13 and the ball circulating portion 12b. Since the nut 12 is used so as not to rotate while the balls 13 are circulating, the balls will not collide against a wall of each ball circulating portion 12b.

Figure 4A:
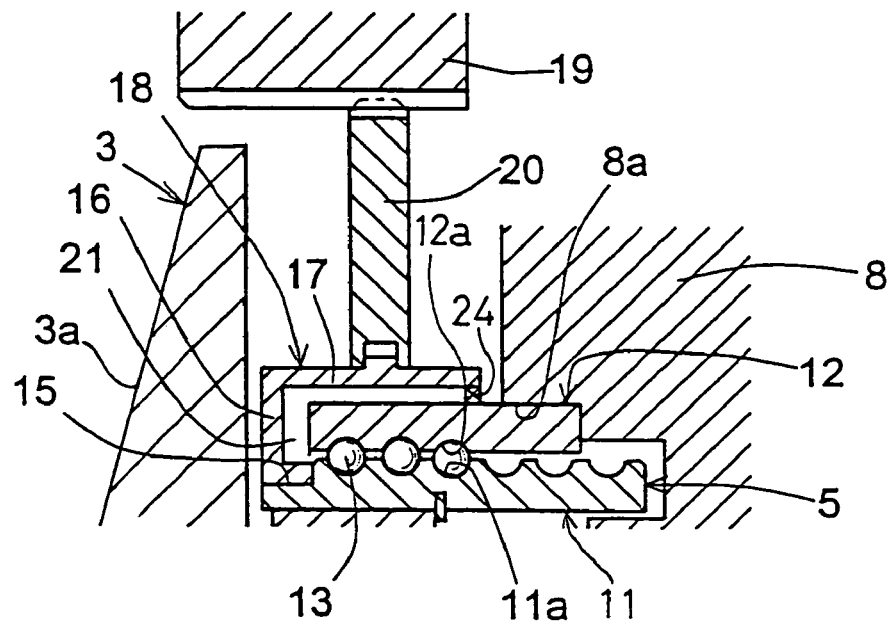
FIGS. 4A and 4B are partially omitted longitudinal sectional views of a second embodiment.
Figure 4B:
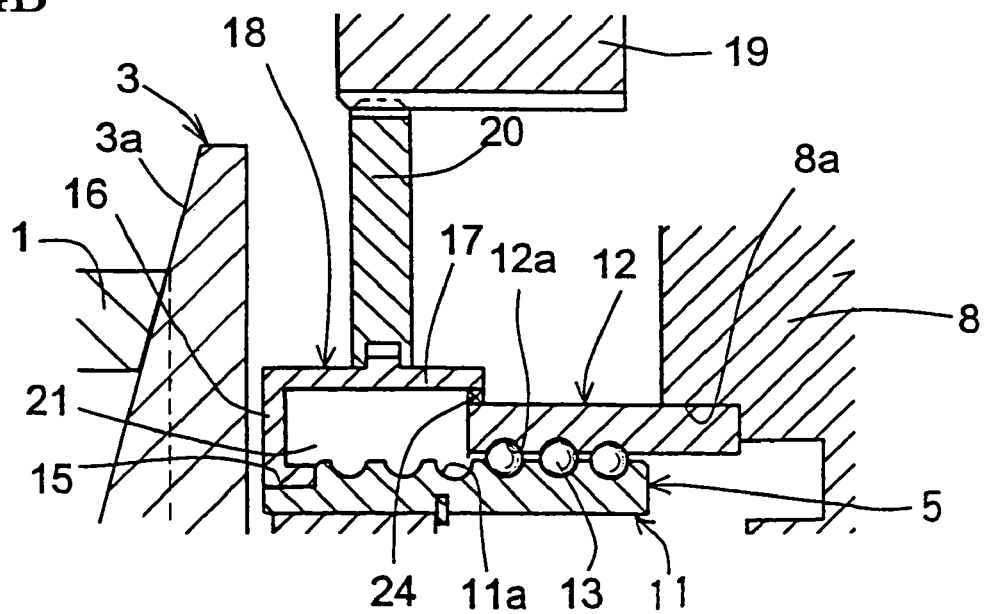

FIGS. 4A and 4B show a second embodiment. This belt type infinite variable-speed drive has the same basic structure as that of the first embodiment, and differs only in a form of overhang 17 of coupling member 18. This overhang 17 overhangs with a small gap formed between it and an outer periphery of nut 12, and a rubber seal member 24 is provided on an inner periphery of the nut at a tip of the overhang to seal the gap. Thus, in this embodiment, too, annular space 21 is sealed, so that lubricating grease for ball-screw mechanism 5 will not splash out from the annular space.

Figure 5:
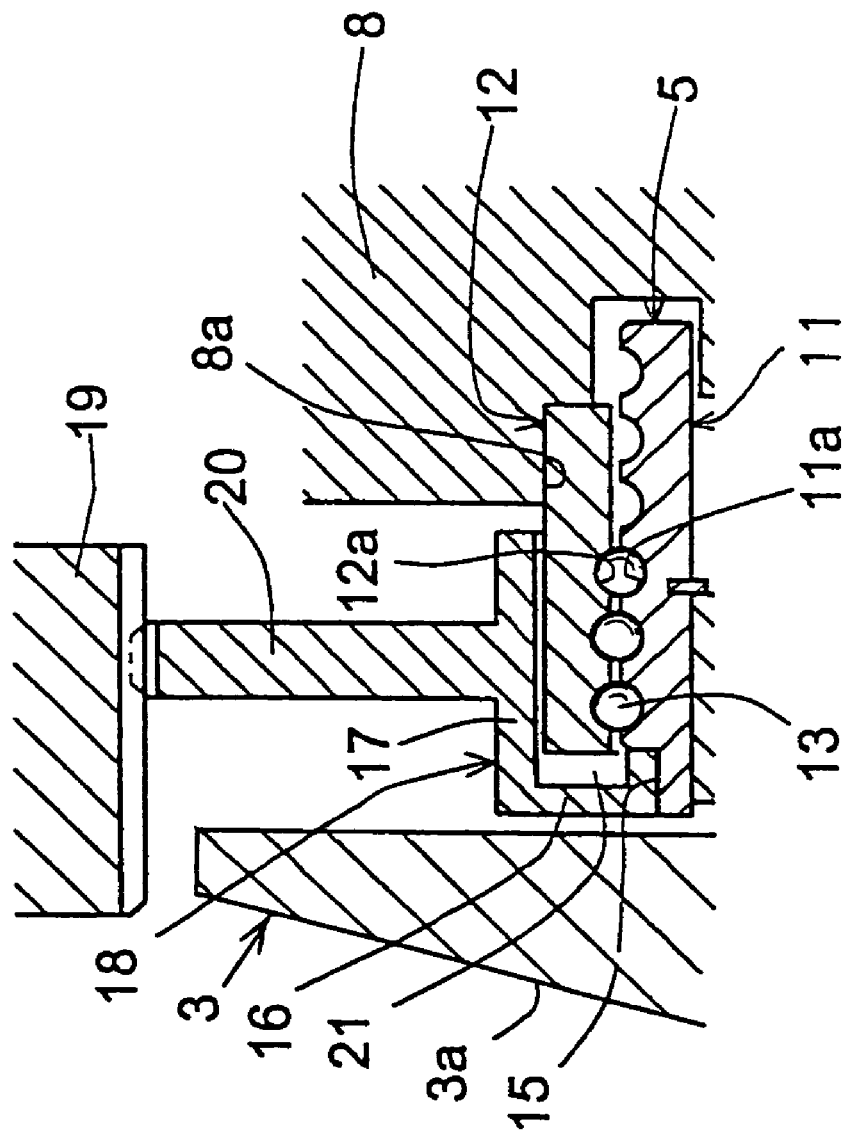
FIG. 5 is a partially omitted longitudinal view of a third embodiment.

FIG. 5 shows a third embodiment. This belt type infinite variable-speed drive is basically the same in its basic structure as that of the first embodiment, and differs only in that coupling member 18 is formed integral with gear 20 by injection-molding a resin. Other portions in the second and third embodiments are the same as those in the first embodiment. Thus, these portions are shown by the same numerals as they are in FIGS. 1 and 2.

In each of the embodiments, the coupling member 18 is fitted on the outer periphery of the threaded shaft 11 at an end of the threaded shaft. But, the coupling member 18 only has to be reliably secured to the end of the threaded shaft 11. Thus, the coupling member 18 may be secured to an end face or to an inner periphery of the threaded shaft 11.

As described above, with the belt type infinite variable-speed drive of this invention, by mounting a nut of a ball-screw mechanism so as to not be rotatable and not be axially movable, and coupling a threaded shaft to a movable pulley member so as to be rotatable and axially movable, when the movable pulley member is axially moved, ball circulating portions of the nut do not rotate. Also, the ball circulating portions, which are low in resistance to load, are directed in such a direction that no load acts on the ball-screw mechanism. Thus, the belt type infinite variable-speed drive can be designed compactly and rationally. Also, it is possible to prevent noise due to vibration of balls in the ball circulating portions.

What is claimed is:

1. A variable-speed drive comprising:
   a pulley mounted on a rotary shaft, said pulley being defined by a fixed pulley member having a belt-receiving surface and a movable pulley member having a belt-receiving surface, with said belt-receiving surface of said fixed pulley member facing said belt-receiving surface of said movable pulley member;
   a transmission belt on said pulley;
   a ball-screw mechanism for axially moving said movable pulley member along said rotary shaft so as to change a diameter of said transmission belt in a step-less manner, said ball screw mechanism including
      (i) an axially movable shaft having a helical thread groove in an outer peripheral surface thereof, said axially movable shaft being coupled to said movable pulley member,
      (ii) an immovable nut having a helical thread groove in an inner peripheral surface thereof and at least one ball circulating portion, said immovable nut being mounted on said axially movable shaft such that said helical thread groove of said immovable nut opposes said helical thread groove of said axially movable shaft, and
      (iii) balls rollably received between said helical thread groove of said immovable nut and said helical thread groove of said axially movable shaft, wherein said balls are to be infinitely circulated between said helical thread groove of said immovable nut and said helical thread groove of said axially movable shaft via said at least one ball circulating portion,
   such that upon rotation of said axially movable shaft said axially movable shaft moves axially along said rotary shaft, whereby said movable pulley member also moves axially along said rotary shaft;
   a coupling member fixed to one end of said threaded shaft, said coupling member including a flange extending away from an outer periphery of said threaded shaft and an overhang extending from said flange along the outer periphery of said threaded shaft such that an annular space is defined between said threaded shaft and said overhang, within which annular space said immovable nut is receivable; and
   a gear, for transmitting a driving force to said threaded shaft, surrounding said overhang,
   wherein a length of said overhang along the outer periphery of said threaded shaft is greater than a maximum stroke of relative axial movement between said threaded shaft and said immovable nut such that said immovable nut is not completely removed from said annular space during the relative axial movement between said threaded shaft and said immovable nut,
   wherein the maximum stroke of relative axial movement between said threaded shaft and said immovable nut corresponds to a minimum distance between said belt-receiving surface of said fixed pulley member facing said belt-receiving surface of said movable pulley member, and
   wherein said seal is for sealing said annular space between the inner periphery of said overhang and the outer periphery of said immovable nut at the maximum stroke of relative axial movement between said threaded shaft and said immovable nut.

2. The variable-speed drive according to claim 1, wherein said seal comprises the inner periphery of said overhang and the outer periphery of said immovable nut defining therebetween a radial gap having a minimum value such that the radial gap functions as said seal.

3. The variable-speed drive according to claim 1, wherein said seal comprises an elastic member mounted to one of the inner periphery of said overhang and the outer periphery of said immovable nut.

* * * * *